United States Patent
Brüls

(10) Patent No.: US 6,334,023 B1
(45) Date of Patent: Dec. 25, 2001

(54) METHOD OF AND ARRANGEMENT FOR RECORDING AND REPRODUCING VIDEO IMAGES

(75) Inventor: Wilhelmus H. A. Brüls, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/024,629

(22) Filed: Feb. 17, 1998

(30) Foreign Application Priority Data

Feb. 21, 1997 (EP) .............................. 97200505

(51) Int. Cl.[7] .................................. H04N 5/93
(52) U.S. Cl. ..................... 386/54; 704/503; 386/96; 382/284; 382/294
(58) Field of Search ................. 386/4, 45–46, 386/52, 64, 69–70, 96, 124, 117, 121, 54; 345/328; 358/909.1; 348/588; 382/293, 284, 294; 705/500, 503, 501; H04N 5/93

(56) References Cited

U.S. PATENT DOCUMENTS

| | | | | |
|---|---|---|---|---|
| 4,888,643 | * | 12/1989 | Kusakabe | 348/578 |
| 5,164,831 | * | 11/1992 | Kuchta et al. | 386/121 |
| 5,325,449 |   | 6/1994  | Burt et al.  | 382/56  |
| 5,384,674 | * | 1/1995  | Nishida et al. | 385/121 |
| 5,440,401 | * | 8/1995  | Parulski et al. | 386/124 |
| 5,537,530 |   | 7/1996  | Edgar et al. | 395/157 |
| 5,568,275 |   | 10/1996 | Norton et al. | 386/52 |
| 5,646,697 | * | 7/1997  | Kurashige | 348/459 |
| 5,649,032 | * | 7/1997  | Burt et al. | 382/284 |
| 5,706,097 | * | 1/1998  | Schelling et al. | 358/909.1 |
| 5,799,319 | * | 8/1998  | Atkins | 707/200 |
| 6,018,744 | * | 1/2000  | Mamiya et al. | 707/104 |
| 6,029,136 | * | 2/2000  | Tsutsui | 704/500 |
| 6,094,636 | * | 7/2000  | Kim | 704/500 |
| 6,122,618 | * | 9/2000  | Park | 704/500 |

FOREIGN PATENT DOCUMENTS

| | | | |
|---|---|---|---|
| 0526064A2 |   | 2/1993 | (EP) . |
| 0545727 A2 | * | 6/1993 | (EP) .......................... G11B/27/32 |
| 0572228A2 |   | 12/1993 | (EP) . |
| 0753852A1 |   | 1/1997 | (EP) . |
| 2195482A |   | 8/1990 | (JP) . |
| WO9207359 |   | 4/1992 | (WO) . |
| WO9429868 |   | 12/1994 | (WO) . |

* cited by examiner

Primary Examiner—Vincent F. Boccio
(74) Attorney, Agent, or Firm—Edward W. Goodman

(57) ABSTRACT

In a method for recording video images and the associated sound with a reduced resolution, in such a manner that the recorded information can be reproduced by means of standard equipment, video frames are filtered so as to derive browse sets having a reduced number of pixels. A number of 16 browse sets are stored in a frame memory in order to form a mosaic frame of 4×4 browse sets, after which the mosaic frame is recorded. Audio samples are processed to form audio browse samples: the most significant half (MSH) of the bits of a first audio sample is used as the MSH of an audio browse sample and the MSH of a ninth audio sample is used as the least significant half (LSH) of the bits of this audio browse sample, which is subsequently recorded. In this way, the information required to edit a recording is reduced by a factor of 16.

13 Claims, 6 Drawing Sheets

METHOD OF AND ARRANGEMENT FOR RECORDING AND REPRODUCING VIDEO IMAGES

BACKGROUND OF THE INVENTION

1. Field of The Invention

The subject invention relates to the recording of video images and sound, and more particularly, to the recording of these video images and sound for the purpose of editing the recording.

2. Description of The Related Art

Video recording for the recording of image and sound of scenes is generally known today. A camera converts image and sound into electric signals which are stored on a carrier such as a magnetic tape; a playback apparatus reads these signals from the carrier and generates a signal for application to a reproducing apparatus, such as a monitor or a television set, in order to be reproduced.

Conventional practice was to record these electric video signals in analog form. Nowadays digital recording is also known, for which compression techniques, such as DVC, can be used. In both cases, the recording may be regarded as a sequence or series of recorded images with associated sound, these images having been provided with a unique identification number.

In the field of image recording and reproduction, there is a need to be able to arrange the recorded images in a sequence which deviates from the recorded sequence. This is the case, for example, with an amateur film-maker who wishes to make a holiday film, but it also applies to a professional film-maker who can or wishes to use only a part of his/her recordings. Prior to the actual pasting, the user should view and judge the recorded sequence and decide which parts of this sequence he/she wishes to use for recording on a target carrier and in what order; this process will be referred hereinafter as "editing".

Conventional editing is effected by simply playing the carrier with the recordings on a playback apparatus, viewing the reproduced images, and taking notes. Images are pasted in a conventional manner by playing back a carrier with recordings by means of a playback apparatus and by applying the electric signals generated by this playback apparatus to a recording apparatus to record them on another carrier. To paste a recording at a desired location, the user positions the recording head of the recording apparatus at the desired location with respect to the target carrier, positions the playback head of the playback apparatus at the beginning of the desired recording on the source carrier, and subsequently starts the playback apparatus and the recording apparatus at the same time. However, this is a rather intricate, time-consuming and inaccurate procedure.

Therefore, in order to achieve a greater ease of use, computer programs have been developed for the editing of recordings. The recordings are then read into a computer memory. Subsequently, the user views the images read into the computer memory on a monitor or television set for the purpose of editing and gives edit commands to the computer in accordance with his/her edit decisions. In response to the edit commands entered by the user, the computer then reads the images from the memory in the sequence determined by the user, the image signals being available on a signal output of this computer in order to be recorded on the target carrier.

It will be evident that these tasks can be performed not only by a dedicated computer, but also by a suitably programmed standard computer such as a PC. Hereinafter, such a computer will also be referred to as an editing computer.

The use of such a computer presents various problems.

First of all, the required amount of storage capacity is comparatively large. For example, the storage of video recordings having a length of 1 hour requires approximately 11 GB when the digital signals have been compressed in accordance with the DVC format. It is to be noted that hereinafter, it is assumed that the recordings have been compressed in accordance with the DVC format, but it will be evident that the invention is not limited thereto. The use of other compression techniques is also conceivable. Alternatively, the recordings may have been recorded in analog form, but in order to save storage capacity, it is preferred to use a compression technique, such as DVC, for reading into the computer memory.

Secondly, it takes much time to read these video recordings into the memory. Normally, the playback apparatus being used can play the source carrier only at the "normal" speed, which implies that the read-in of said video recordings then takes 1 hour. It is true that some playback equipment is capable of playing at two or even four times the "normal" speed, but this equipment is fairly expensive.

Thirdly, a comparatively high bit-rate is required for editing the images read into the memory. When the digital signals have been compressed in accordance with the DVC format, the bit-rate during read-out from the memory is approximately 25 Mbit/s. This also holds for the read-in of the recordings.

SUMMARY OF THE INVENTION

It is an object of the invention to provide a solution for the afore-mentioned problems.

The present invention is based on the recognition of the fact that during editing, the user does not need images having the full resolution. It is sufficient to view low-resolution images, after which, the actual editing operation is performed upon full-resolution images.

On the basis of this, it would, in principle, be possible to derive low-resolution images from the original recordings of full-resolution images. Such a procedure is useful if the invention is used in conjunction with existing recordings. When the images are read into the memory of the editing computer, the original recordings are then played back, the computer thus receiving a sequence of full-resolution images. The computer has then been programmed to turn each full-resolution image received into a reduced-resolution image and to store this reduced-resolution image in the computer memory. This already yields the advantage that less storage capacity is required. During editing, these reduced-resolution images are used, which has the advantage that the bit-rate is comparatively low.

However, in accordance with the invention, dual recording is effected during the recording of the images: of each image to be recorded, a full-resolution version is recorded along with a version of strongly reduced resolution, the full-resolution image and the low-resolution image being provided with mutually corresponding identification numbers. During the read-in of images into the editing computer, the original low-resolution images are played back, which also has the advantage that the bit-rate during reading into the computer memory is comparatively low. Eventually, the edit commands selected by the user will be performed upon the original high-resolution images.

As already stated, a recording comprises a sequence of discrete images, the normal reproduction time for an individual image being fixed; this time is $\frac{1}{25}$ s when the PAL standard is used. The reproduction of a low-resolution image would then also require ⅕₂₅ s. In accordance with a further aspect of the present invention, a multiplicity of N low-resolution images are combined to form a single combination image of normal resolution, in the form of a so-called mosaic image. In a manner comparable to that described hereinbefore, this combination can be effected by the editing computer during the read-in of the images into the computer memory, which already yields the advantage that viewing a recording takes less time. However, preferably, this combination is already effected during said dual recording, which has the advantage that during the read-in of the combination images into the memory of the editing computer, the combination images being read in by a standard playback apparatus, the required time has been reduced by a factor N. Indeed, now one combination image is read and loaded into the computer memory in ⅕₂₅ s, this combination image corresponding to N original low-resolution images.

BRIEF DESCRIPTION OF THE DRAWINGS

The aforementioned and other aspects, characteristic features and advantages of the present invention will be elucidated with the aid of the following description of a preferred embodiment of the invention, with reference to the drawings, in which.

DESCRIPTION OF THE PREFERRED EMBODIMENTS

Figure 1:
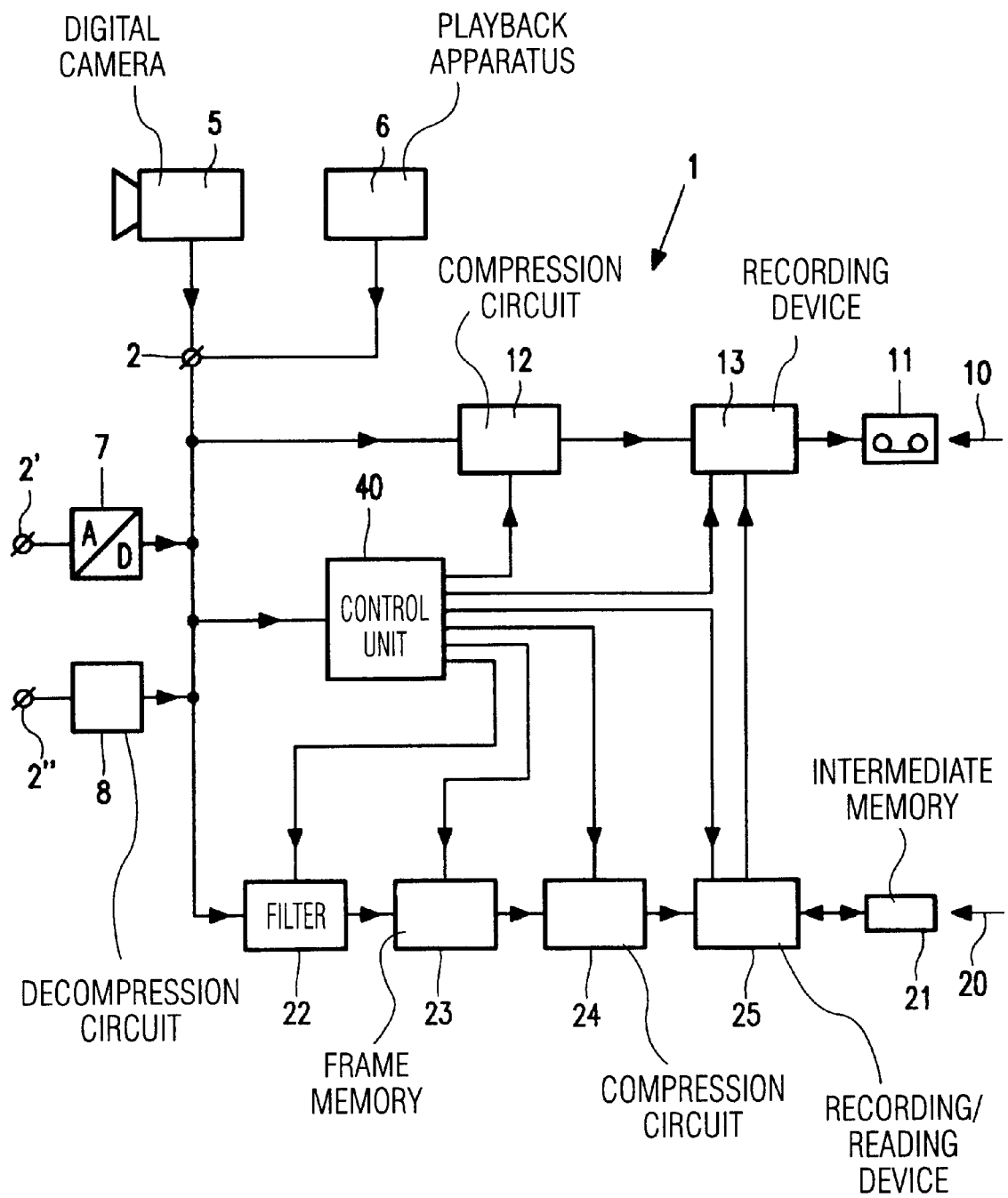
FIG. 1 is a block-schematic diagram showing an arrangement in accordance with the present invention.

FIG. 1 shows a block-schematic diagram of a recording arrangement 1 in accordance with the present invention. The recording arrangement 1 has a digital signal input 2 arranged to receive digital video information. This digital video information can be furnished, for example, by a recording apparatus 5, such as a camera, to be connected to the input 2. However, this video information can also be supplied by a playback apparatus 6 for playing back existing recordings, to be connected to the input 2.

It is to be noted that the digital signal input 2 can be used in conjunction with a signal-delivery apparatus, such as a camera 5 or a playback apparatus 6, if such an apparatus is adapted to supply digital video signals. For cooperating with a signal-delivery apparatus adapted to supply analog video signals, the arrangement 1 is provided with an analog signal input 2' connected to a converter 7 for supplying digital video signals, the converter 7 can having an output coupled to the digital input 2. For cooperating with a signal-delivery apparatus adapted to supply compressed digital video signals, the arrangement 1 is provided with a second digital signal input 2", which is connected to a decompression circuit 8 for supplying digital video signals, the decompression circuit 8 having an output coupled to the digital input 2. The inputs 2 and/or 2' and/or 2" can be external connections.

It is to be noted that hereinafter, the recording arrangement 1 will be described as a separate arrangement, but that the recording arrangement 1 can also form part of a camera 5. In that case, the input terminals may be dispensed with and the input 2 is internally coupled to an image-signal generating means of the camera.

The recording arrangement 1 comprises two recording channels 10, 20. The first recording channel 10 will be referred to as the normal recording channel and produces a standard digital video recording on a carrier 11, which is suitably a magnetic tape. For this purpose, the normal recording channel 10 comprises a first compression circuit 12, which has an input coupled to the input 2, and a first recording device 13, which is coupled to the compression circuit 12 for receiving a compressed digital video signal, and for recording the compressed digital video signal on the carrier 11.

The compression circuit 12 can be a known compression means, for example, for effecting a compression in accordance with the JPEG format, the MPEG format or the DVC format. Since the present invention is very suitable for use in conjunction with DVC compression, it is assumed hereinafter that in each case, DVC compression is used. As the nature and construction of the compression circuit 12 fall beyond the scope of the present invention and an expert does not require knowledge thereof for a proper understanding of the present invention, while, furthermore, compression circuits are known per se, and the present invention can be applied using any known compression circuit, said compression circuit 12 will not be described in further detail.

For similar reasons, the recording device 13 will not be described in more detail. It is to be noted only that the digital video signals recorded on the carrier 11 can be reproduced by a standard playback apparatus, such as a digital video recorder.

The second recording channel 20, referred to as the browse-recording channel, effects a digital video recording in an intermediate memory 21, which is suitably a hard-disk included in the recording arrangement 1. For this purpose, the browse-recording channel 20 comprises a filter 22, which has an input coupled to the input 2, a frame memory 23, a second compression circuit 24, and a second recording/read device 25 coupled to the second to the second compression circuit for receiving a compressed digital video signal and for recording the compressed digital video signal in the intermediate memory 21.

For the same reasons as mentioned in the foregoing, the second compression circuit 24 and the second recording/read device 25 will not be described in more detail. It is to be noted merely that the second compression circuit 24 preferably operates in accordance with the same compression format as the first compression circuit 12. Furthermore, it is to be noted that the second recording/read device 25 and the intermediate memory 21 can together be formed by a standard hard-disk unit.

The recording of digital video signals in the intermediate memory 21 will now be described, for which also reference is made to FIG. 2.

Video signals take the form of a sequence of successive separate pictures, referred to as "frames". Each frame may be regarded as a set of picture elements or pixels, the number of pixels in a vertical direction being referenced $P_V$ and the number of pixels in a horizontal direction being referenced $p_H$. As is known, a television set does not display the pixels of a frame at the same time, but the frames are written in the form of $(p_V)$ horizontal lines, writing being effected in an interlaced fashion.

It is obvious that a video signal which represents a frame should comply with a multitude of rules, these rules together being referred to as a video standard or video format. An example of such a format is PAL; writing one complete frame takes 1/25 s in the case of the PAL format. When a video signal complies with a standard, it can be applied directly to a reproducing apparatus adapted to this standard; a video signal which represents a frame but which does not comply with the video standard of a reproducing does not yield normal images during reproduction on this reproducing apparatus, in which case, the images are usually not identifiable by a viewer. Hereinafter, the term "frame" is assumed to refer not only to a set of pixels which fill a whole screen, but also to a video signal which complies with a predetermined video standard.

Figure 2:
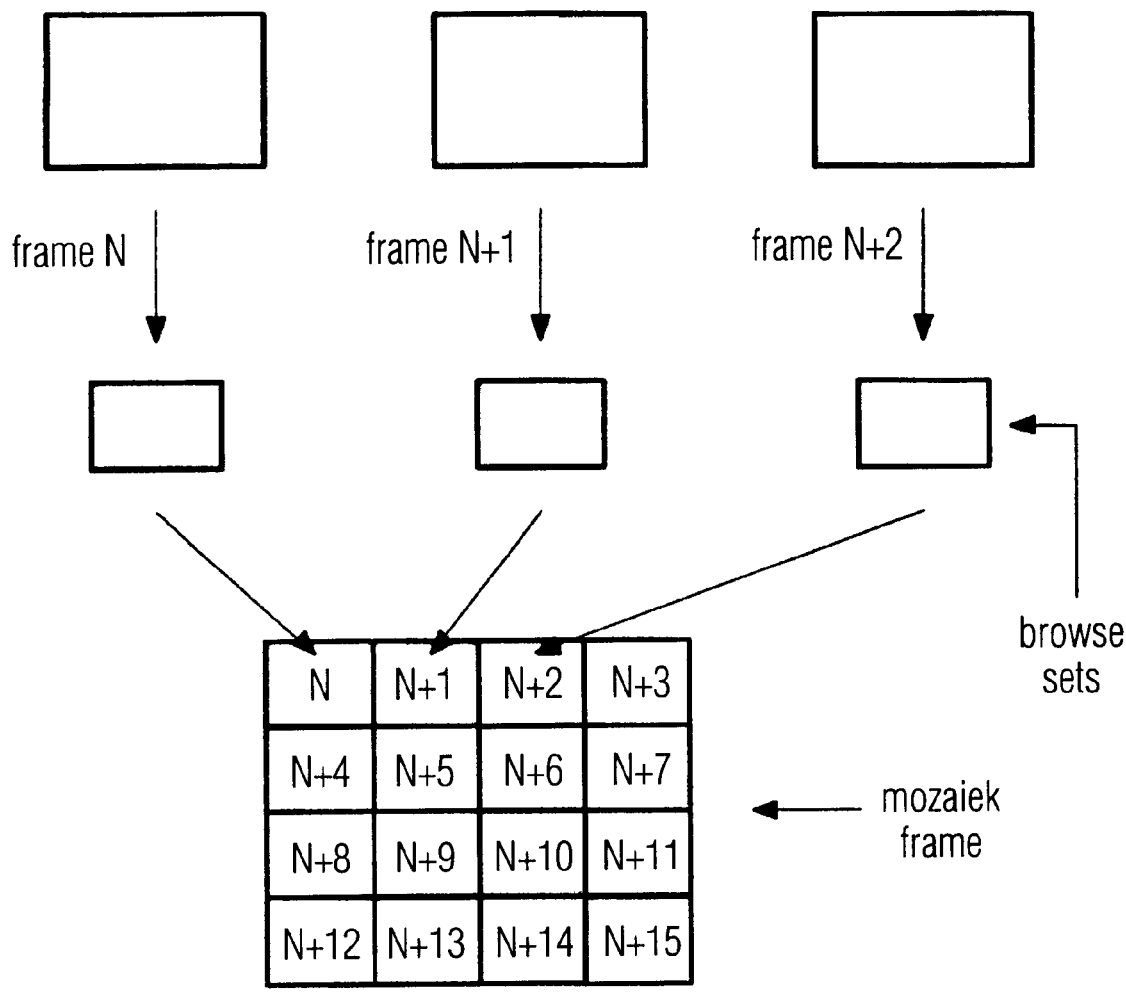
FIG. 2 diagrammatically illustrates the composition of a mosaic frame.

The upper part of FIG. 2 shows a series of successive frames numbered N, N+1, N+2, etc. In the first recording channel 10, these frames N, N+1, N+2, etc., are recorded as successive full frames and, in addition, identification information, such as an identification number (N), is recorded for each frame.

In the second recording channel 20, however, the successive frames are first subjected to a filter operation by the filter 22, as a result of which, the number of pixels is reduced. The filter factor in a horizontal direction is designated $a_H$ and the filter factor in a vertical direction is designated $a_V$. As a result of the filter operation, the resolution of the frame in a horizontal direction is reduced by said factor $a_H$ and the resolution of the frame in a vertical direction is reduced by said factor $a_V$. This results in a set of pixels referred to as a "browse set". The number of pixels in a browse set is smaller than the number of pixels in a frame. The number of pixels in a horizontal direction of a browse set can be written as $p_H/a_H$ and the number of pixels in a vertical direction of a browse set can be written as $p_V/a_V$. The total number of pixels in a browse set can therefore be written as $(p_H \cdot p_V)/(a_H \cdot a_V)$.

In principle, $a_V$ and $a_H$ may differ from one another and can be arbitrary, preferably integral, numbers. Preferably, $a_V$ and $a_H$ are 4 because filtering can then be effected properly and simply in combination with existing compression systems operating with DCT blocks of 8×8 pixels.

The filter operation can be effected by, each time, removing one pixel from a series of successive pixels and skipping others. The filter operation can also be effected by each time averaging a number of pixels. In the preferred case that $a_V$ and $a_H$ are 4, a first browse pixel could be formed as an average of 16 pixels (4×4) at the top left in a frame, etc. Since such a method for the conversion from one resolution to the other is known per se and it will be obvious to the expert how such a filter 22 can be constructed, a further description of such a filter 22 will not be given.

The browse set N derived from said frame N is stored in a part of the frame memory 23. A frame memory is a memory having a capacity which is adequate for the storage of one complete frame and is known per se.

Likewise, a browse set N+1 is derived from the next frame N+1 and is also stored in a part of the frame memory 23 but at a location other than the location where the preceding browse set N has been stored. For controlling said operations, the recording arrangement 1 has a control unit 40, as will be evident to the expert.

It will be obvious that it is thus possible to store a total of $a_V \cdot a_H$ browse sets in the frame memory 23. FIG. 2 illustrates that 16 successive sets N, N+1, N+2 . . . , N+15, are preferably stored in the frame memory 23 in such a manner that first four successive browse sets N, N+1, N+2, N+3, are stored adjacent one another, below these the next four successive browse sets adjacent one another, etc. However, another storage sequence is also possible.

Thus, a frame with the pixels of 16 successive browse sets is built up in the frame memory 23; such a frame is referred to as a "mosaic frame". When such a mosaic frame is displayed on a display screen, the individual browse sets appear adjacent and below one another as thumbnail images, as illustrated in FIG. 2. It is to be noted that for the sake of clarity, the browse sets and the mosaic frame in FIG. 2 have been enlarged in proportion to the original frames.

When the frame memory 23 is full, the mosaic frame stored therein is compressed by the compression circuit 24 and is stored in the intermediate memory 21 by the recording/read device 25. After this, a new sequence of 16 successive browse sets is loaded into the frame memory 23 and, subsequently, the relevant mosaic frame is compressed and stored in the intermediate memory 21, this process being repeated as long as frames are being recorded on the carrier 11.

Once the described recording operation has been completed, each frame of the recordings has thus been stored twice: one time as a complete full-resolution image on the carrier 11, and one time as a browse set of reduced resolution, forming part of a mosaic frame in the intermediate memory 21. Obviously, there is a 1-to-1 relationship between the complete images on the carrier 11 and the browse sets in the intermediate memory 21. Preferably, an identification number (N) is assigned to each frame and browse set, respectively, during recording of the frames on the carrier 11 and during storage of the browse sets in the intermediate memory 23, these identification numbers being stored together with these frames and browse sets.

With the scope of the present invention, the mosaic frames and the complete frames can be provided on two separate carriers which are associated with one another. For this purpose, it is useful, for example, to construct the intermediate memory 21 as a storage means which can be loaded directly into a PC in order to be read, such as, for example, a PCMCIA card with hard disk, known per se. However, for given uses, it is desirable that the mosaic frames from the intermediate memory 21 are also written onto the carrier 11. Preferably, an initial part of the carrier 11 is left free for this purpose when recording commences. Upon completion of the recording, the carrier 11 is rewound to the beginning and the mosaic frames are read from the intermediate memory 21 by the second recording/read device 25, which transfers the information thus read to the first recording device 13, which, in turn, records the received information on said initial part of the carrier 11. To this end, the second recording/read device 25 is coupled to the first recording device 13.

If $a_H$ and $a_V$ are both 5, one mosaic frame in the intermediate memory 21 corresponds to 25 frames on the carrier 11, which corresponds to one second of real-time video (PAL). A one-hour video recording on the carrier 11 (90,000 frames) then corresponds to 3600 mosaic frames, which can be recorded on an initial part of the carrier 11 having a length of 2.4 minutes. As stated above, both $a_H$ and $a_V$ are preferably 4; in that case, a one-hour video recording on the carrier 11 corresponds to 5625 mosaic frames, which can be recorded on an initial part of the carrier 11 having a length of 3.75 minutes.

Figure 6:
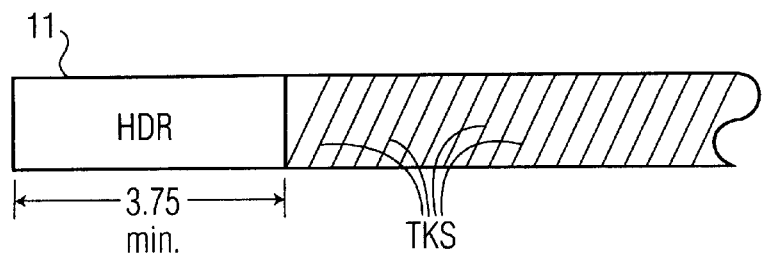
FIG. 6 is an illustration of a carrier on which the video signal is recorded.

FIG. 6 shows an illustration of the carrier 11 having a leading portion HDR which is initially left blank, and the successive frames of the video signal, along with the identification numbers, are recorded in the tracks TKS. The carrier 11 is then rewound and the mosaic frames are recorded in the leading portion HDR.

Although in the foregoing, the recording arrangement 1 has been illustrated as being constructed by means of hardware components, it will be evident that it is alternatively possible to integrate parts of the recording arrangement 1. It is also possible to realize the recording arrangement 1 in the form of a suitably programmed standard computer such as a PC.

Moreover, it will be evident that it is also possible to produce a series of mosaic frames with an existing recording made on a carrier 11. To this end, the carrier 11 is played back by a read apparatus connected to one of said inputs 2, 2', 2". It is likewise possible to construct the first recording device 13 as a recording/read device, an output of the recording/read device being now connected to the filter 22.

If, as stated hereinbefore, the mosaic frames have been stored on the carrier 11 in accordance with the same format as the full frames, the present invention yields the important advantage that a user can view the mosaic frames using standard equipment, such as a standard playback apparatus and a standard TV set. The mosaic frames are decompressed by the playback apparatus in a standard fashion and the decompressed video signal is applied to the TV set. The display screen of the TV set then displays a sequence of mosaic frames. If the playback apparatus has been set to the normal playback speed, the mosaic frames are reproduced in PAL format at a rate of 25 mosaic frames per second. Thus, by using standard equipment, the user can rapidly get an overview of the recordings stored on the carrier 11.

Figure 7:
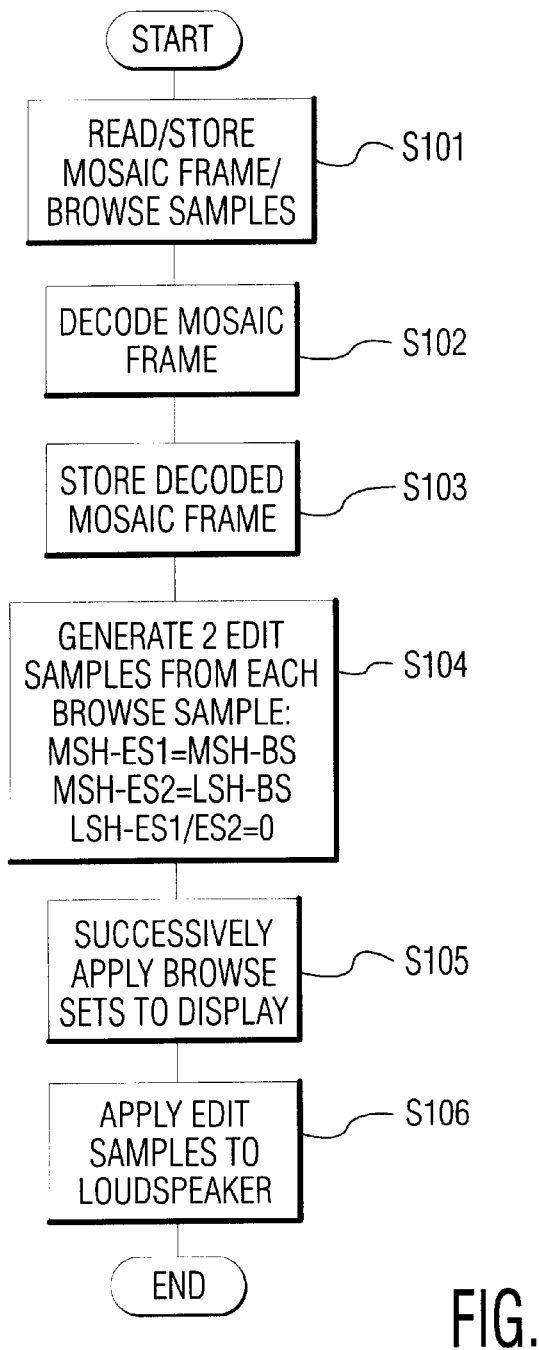
FIG. 7 is a flowchart showing the operation of the editing computer.

Hereinafter, the editing and pasting of the recordings on the carrier 11 will be described with reference to FIG. 3 and the flowchart in FIG. 7.

An editing computer 100, which can be a suitable programmed standard computer, such as a PC, having a central processing unit 140, has a terminal 102 for the connection of a recording/reproducing apparatus 53, for example, a digital video recorder. In a first stage, the recording/reproducing apparatus 53 is operated in a read mode in order to read the recorded mosaic frames from the carrier 11 and to apply the information thus read to the terminal 102, the compressed mosaic frames being stored in an intermediate memory 110 of the editing computer 100 (step S101), this intermediate memory being, for example, a hard disk or RAM.

An important advantage of the present invention is that the time for reading the mosaic frames into the intermediate memory 110 of the editing computer 100 is comparatively short. If the recording/reproducing apparatus 53 is operated at the normal speed (real time), the read-in of the mosaic frames corresponding to one-hour real-time full video frames requires only 3.75 minutes if $a_H$ and $a_V$ are both 4. Another important advantage of the present invention is that this requires only 700 MB storage capacity.

In a second stage, the user can view and judge (edit) the image information stored in the intermediate memory 110. There are various possibilities of doing so. In the first place, the user can simply display the recordings as successive mosaic frames on a display screen 120. It is then possible to choose from different reproducing speeds, varying from still to the normal speed (25 mosaic frames per second).

In the second place, the user may opt to display only one browse set at a time rather than to display several browse sets at the same time on the display screen 120. In step S102, a mosaic frame is decoded by a decoder 121 and, in step S103, the decoded mosaic frame is stored in a frame memory 122. The browse set selected by the user is read from the frame memory 122 and displayed on the display screen 120 (step S105). When the browse set is displayed with its intrinsic size, only 1/16th part of the display screen is utilized. However, it is likewise possible to operate the arrangement 100 in a scaled-up mode in which the number of pixels, both in a horizontal direction and in a vertical direction, is doubled by interpolation. Such a scaled-up browse set occupies ¼th part of the display screen.

When the browse sets are thus displayed, the 16 successive browse sets can be read sequentially from the frame memory 122 and displayed on the display screen. This can be effected in real time, which means that 25 browse sets per second (PAL) are displayed in succession. Since a decoding operation is required only once every 16 browse sets, i.e., once for each mosaic frame, decoding can readily be effected by a software implementation.

Displaying several browse sets at a time makes it easier for the user to get an overview of the successive browse sets. In the case of real-time display of the browse sets, it is also possible to reproduce sound, as will be explained hereinafter.

In each of said display modes, the user can make decisions as regards edit operations. For this, the user utilizes a list of edit commands, this list being, for example, entered into the editing computer 100 by a keyboard 141 and stored in an edit-command memory 142 of the editing computer 100. Typically, an edit command has three parameters: fragment number i, start frame A(i), and end frame B(i). This means that the $i^{th}$ video fragment to be edited starts with the browse set bearing the identification number A(i) and ends with the browse set bearing the identification number B(i).

In a monitor mode, the user can view the result of his/her edit commands. The browse sets are then reproduced on the screen 120 in the sequence dictated by the edit commands, the associated sound being also reproduced.

When the user is satisfied, he/she gives a definitive edit command to the editing computer 100. In the definitive editing stage, the editing computer 100 performs edit commands on the full frames recorded on the carrier 11, i.e., the $i^{th}$ video fragment to be edited begins with the full frame bearing the identification number A(i) and ends with the full frame bearing the identification number B(i). First of all, the full frames are loaded into a memory of the editing computer 100, for which purpose, the intermediate memory 110 can be used. Subsequently, the full frames are read out of the memory in the sequence given by the edit commands and are applied to an output of the arrangement 100, this output being connected to the same terminal as the input 102, thus enabling the output sequence of full images to be recorded on a target carrier by the recording/reproducing apparatus 53.

It is to be noted that if the images have been encoded in accordance with the DVC format, the images can be stored in the memory in encoded form and can be output in the same encoded form, as a result of which, it is not necessary to perform any decoding and encoding operations while edit commands are carried out.

Furthermore, it is to be noted that the editing computer 100 can be adapted to load all the images from the carrier 11 into the memory while the full images are being read from this carrier. This could be effected while the user is editing the browse sets. However, it is also possible that the editing computer 100 is adapted not to read the full images from the carrier until after the definitive edit command has been given and then to utilize this definitive edit command by first deriving a list of the desired frames from the list of edit commands and, subsequently, to load only these desired frames into the memory, which also reduces the storage capacity required during the actual editing operation.

The recording method and editing method described above only relate to the video components of the recordings. This could be satisfactory in situations where the sound of the recordings is not relevant or is not used at all, for example, because the sound is added to the edited recordings at a later instant. However, it also conceivable that the accompanying sound is to be edited during editing of recordings, and this sound should, therefore, be monitored; an example of such a situation is a report with spoken comments, or an interview. Therefore, it is a further object of the present invention to provide a method of recording audio with reduced resolution, the recorded audio being suited for reproduction by means of standard playback equipment.

A method of reducing the audio data by a factor of 16, which corresponds to said preferred reduction of the video information by a factor of 4×4, will be described with reference to FIG. 4. From the description, it will be apparent to an expert how other reduction factors can be obtained.

In digital audio recording, a sequence of digits is recorded on the carrier, which may each be regarded as a sample of the sound amplitude. In FIG. 4, this is illustrated by representing the (mono) audio recording as a series of juxtaposed samples, which successively bear a sample identification number M, M+1, M+2, ..., etc. FIG. 4 more in particular shows two such audio recordings side by side for the purpose of stereo recording, one for the left sound channel (L) and one for the right sound channel (R). In the DVC format, this sampling is normally effected 48,000 times per second (per channel).

In order to obtain a reduction factor of 16, it is possible, in principle, to skip, each time, 15 samples and to record each $16^{th}$ sample. This corresponds to sampling at a rate of 3 kHz, which makes it possible to reproduce sound in the spectrum from 0–1500 Hz. However, in accordance with the present invention, a better sound quality can be achieved by recording only a predetermined number of the most significant bits of each sample.

Hereinafter, the example is described of a 16-bit sound recording, i.e., a recording in which each sample comprises 16 bits, which enables a signal-to-noise ratio (SNR) of 96 dB to be obtained. Of these 16 bits, the first 8 bits will be referred to as the most significant half (MSH) of the sample, and the last 8 bits will be referred to as the least significant half (LSH) of the sample. Herein, one 16-bit browse sample is derived from $(a_H \cdot a_V)$ successive audio samples by taking the MSH of the first audio sample and using it as the MSH of the 16-bit browse sample, and by taking the MSH of the $(1+(a_H \cdot a_V)/2)^{th}$ audio sample and using it as the LSH of the 16-bit browse sample.

In an embodiment of the present invention, one 16-bit browse sample is derived from a sequence of 16 successive audio samples M, M+1, ... M+15, by using the MSH of the first sample as the MSH of the browse sample, and by using the MSH of the ninth sample (M+8) as the LSH of the browse sample.

Figure 4:
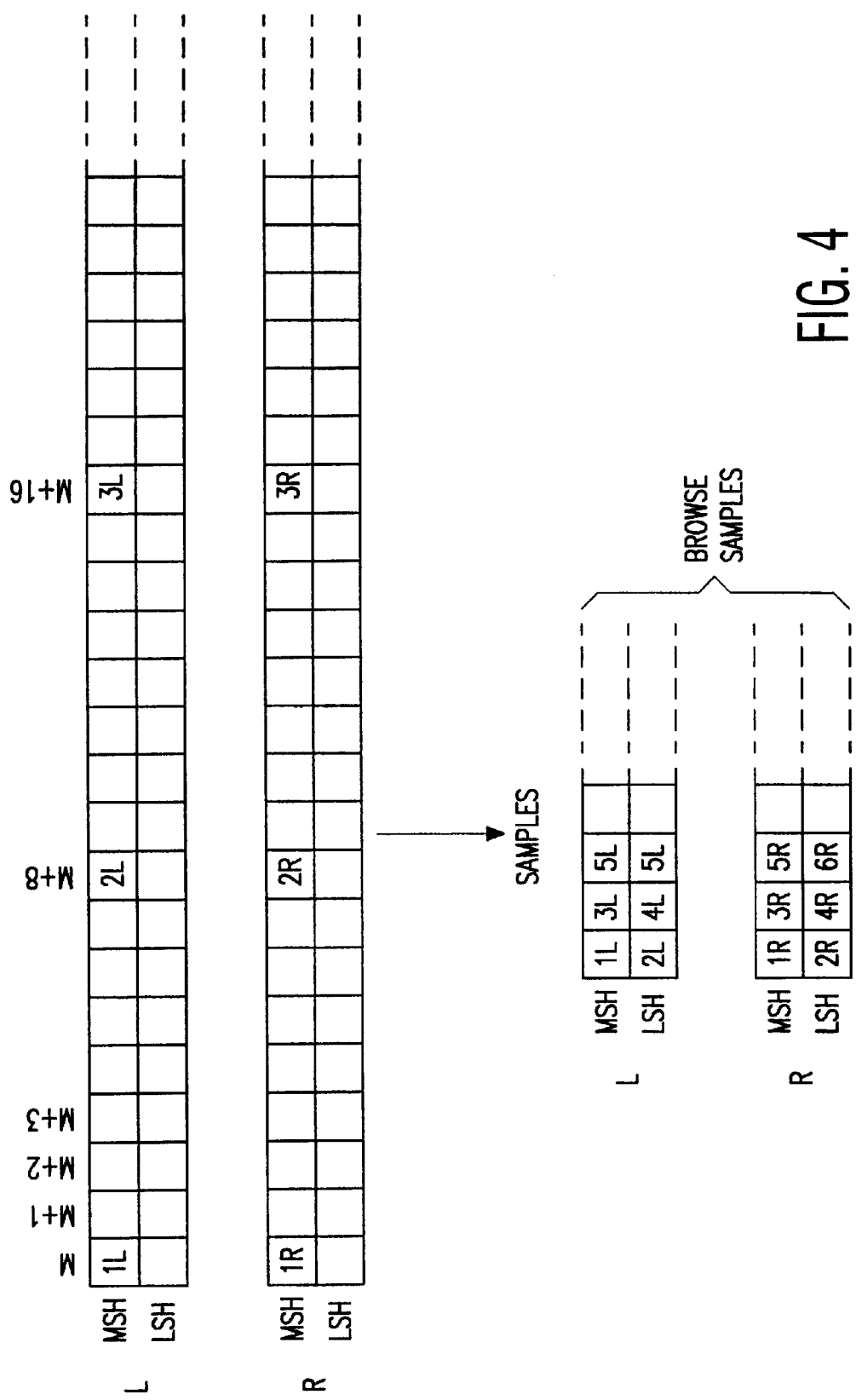
FIG. 4 diagrammatically illustrates the composition of an audio browse sample.

In FIG. 4, the MSH's of the samples of the left-hand channel thus used for composing browse samples are successively referenced 1L, 2L, 3L, 4L, ..., and the MHSs of the samples of the right-hand channels thus used for composing browse samples are successively referenced 1R, 2R, 3R, 4R, ... The structure of the browse audio recording is illustrated, diagrammatically, in the lower part of FIG. 4, which shows, for example, that the first browse sample shown for the left-hand channel has an MSH consisting of MSH 1L and an LSH consisting of MSH 2L.

This sampling is thus based on taking 8-bit samples at a sampling rate of 6 kHz, which enables a sound reproduction with an SNR of 48 dB in the range of 0–3 kHz (telephone quality).

Figure 5:
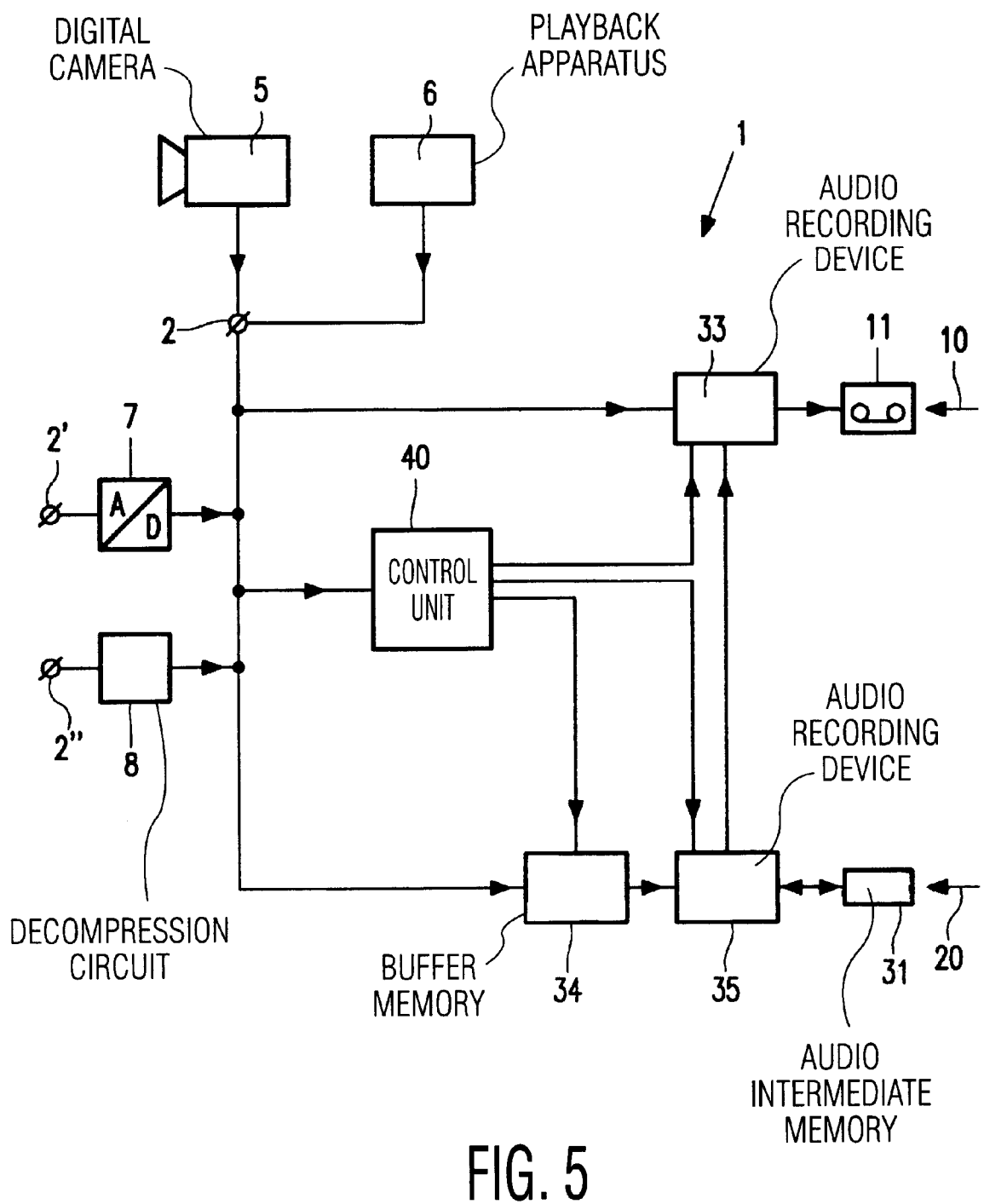
FIG. 5 is a block-schematic diagram of a recording arrangement as regards audio.

Now, reference is made to FIG. 5, which illustrates the audio recording by the recording arrangement described with reference to FIGS. 1 and 2.

In addition to the video information, the input 2 also receives the audio information. In the first recording channel 10, this audio information is recorded on the carrier 11 in a standard fashion by a first audio recording device 33. In the second recording channel 20, a browse sample is derived from a sequence of 16 successive audio samples in a buffer memory 34, this browse sample being applied to a second audio recording device 35 for recording in an audio intermediate memory 31. It is to be noted that the audio intermediate memory 31 and the previously mentioned intermediate memory 21 can form part of the same memory device, such as a RAM or a hard disk, and that the second audio recording/read device 35 and the previously mentioned recording/read device 25 are, in fact, the same recording/read device.

After completion of a recording, the browse samples are read out of the audio intermediate memory 31 by the second audio recording/read device 35 and are recorded on the carrier 11 by the first audio recording device 33.

It has been explained above that the browse video can be reproduced by a standard playback apparatus, the successive frames being displayed in the form of a mosaic frame. In accordance with an important aspect of the present invention, the browse audio can also be reproduced, together with said browse video, by this standard playback apparatus. When the playback apparatus is operated at the normal playback speed, the browse samples are interpreted as "normal" samples, which means that, substantially, only the MSH of each browse sample contributes to the sound reproduction: the LSH of each browse sample may be regarded as a kind of noise at a level of −48 dB. The audio browse samples reproduced at the "normal" speed (i.e., 48,000 per second) consequently correspond to an original sound version whose speed is 16 times as high (this speed being exactly equal to the factor 16 video acceleration) with a sound quality of 1.5 kHz and 48 dB.

Figure 3:
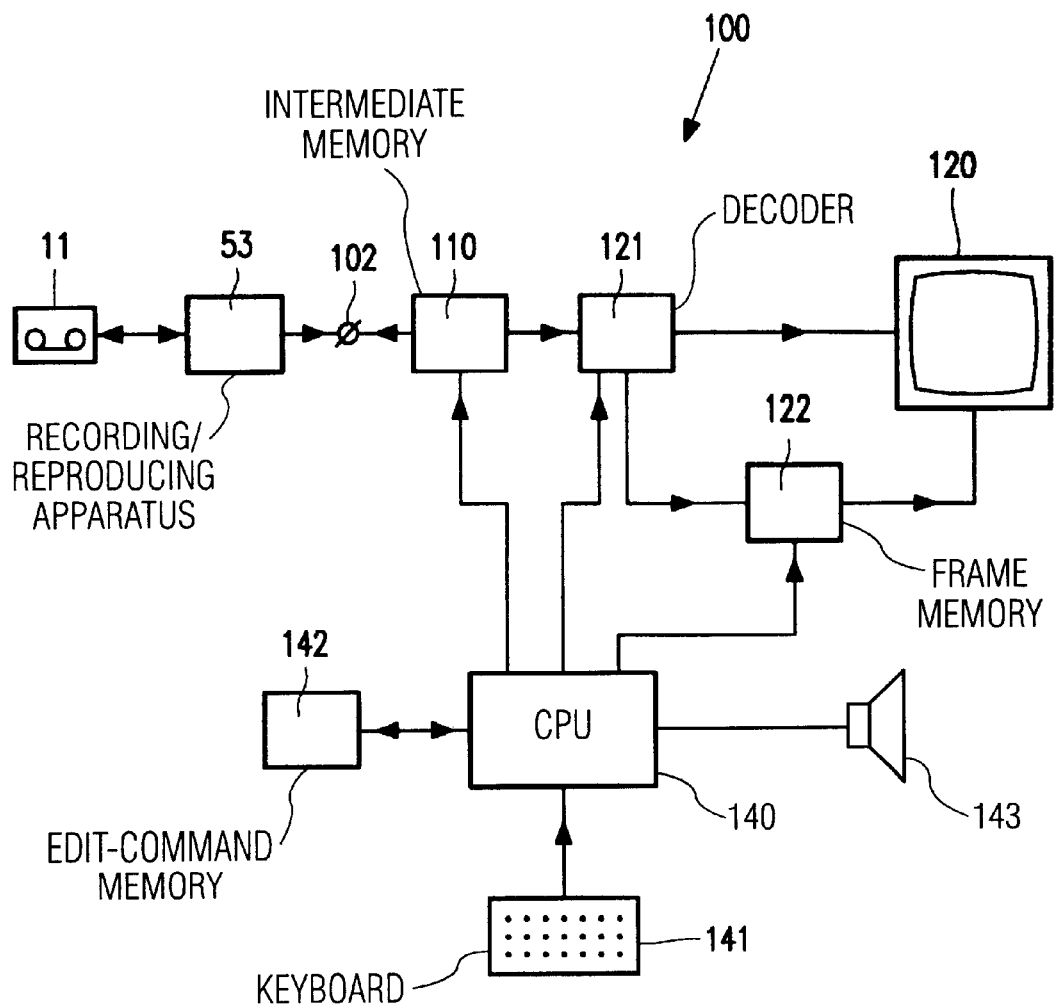
FIG. 3 is a block-schematic diagram of an editing computer as regards video.

As explained, the browse sets can be reproduced in real time during the reproduction of browse recordings by the editing computer 100 (FIG. 3). Again referring to the flowchart of FIG. 7, in step S101, the editing computer 100 reads from the carrier and stores the browse samples, along with the mosaic frame, in the intermediate memory 110. Then, in step S104, the editing computer 100 converts the audio browse samples (BS's) into edit samples (ES's), and, in step S106, reproduces these edit samples in real time on loudspeaker 143, as follows. Each browse sample is converted into two edit samples, the MSH of the first edit sample being similar to the MSH of this browse sample, and the MSH of the second edit sample being similar to the LSH of this browse sample; the LSH of both edit samples are made equal to zero. The edit samples thus computed are reproduced with a frequency of 6 kHz. Referring to FIG. 4, it will be evident that this results in a sound reproduction at "normal" speed, with a quality of 3 kHz and an SNR of −48 dB.

The present invention thus provides a method of recording image and sound recordings with reduced resolution, this resolution reduction amounting to a factor of 16 in the described example, which is a preferred embodiment. The method can be applied to existing recordings, but can be used with great advantage for making new recordings, in which case, recording in accordance with the present invention is effected parallel to a normal recording. In accordance with an important aspect of the present invention, said resolution reduction is effected in such a manner that the number of video frames to be recorded, as well as the number of audio samples to be recorded, is reduced, but these video frames and audio samples are recorded in a normal manner, which yields the important advantage that these reduced-resolution video frames and these reduced-resolution audio samples can be read and reproduced by means of normal equipment. Moreover, each reduced-resolution video frame (mosaic frame) includes information of each individual original video frame, in such a manner that, of each individual original video frame, a scaled-down version is reproduced when the reduced-resolution video frames are read and reproduced by normal equipment.

It will be evident to the expert that the protective scope of the present invention as defined in the Claims is not limited to the embodiments described and shown in the drawings. For example, in a variant in which the recording arrangement 1 forms part of a camera 5 adapted to supply compressed digital video signals, the compression circuit 12 in the first recording channel 10 can be dispensed with, in which case the video signals, before they reach the filter 22 and the control unit 40, are decompressed by a decompression circuit 8 coupled between the input 2 and the inputs of the filter 22 and the control unit 40.

As already stated, the successive mosaic frames are recorded on a carrier in accordance with a video standard, so that when this carrier is played, they can be reproduced directly on a standard reproducing apparatus and then produce a mosaic of a plurality of successive thumbnail images. If the intermediate memory 21 has the form of a carrier, such as the example of a PCMCIA card with hard disk, recording in the intermediate memory can also be effected in accordance with a video standard, but if the intermediate memory 21 functions merely as an intermediate memory and actual recording is effected on a carrier 11 with the aid of the recording device 13, it is not necessary to effect the recording in the intermediate memory in accordance with a video standard.

As is known to the expert, compression in accordance with the DVC standard includes a process in which the pixels are subjected to an operation referred to as a "shuffle" operation. Allowance is to be made for this during the generation and recording of the mosaic frames if it is desired that the recorded mosaic frames are to be displayed. This can be achieved in different manners, as will be evident to those skilled in the art. For example, in the recording arrangement 1 as illustrated in FIG. 1, an inverse shuffle means is coupled between the frame memory 23 and the second compression circuit 24, and a shuffle means is coupled between the second recording/read device 25 and the recording device 13. Such an inverse shuffle means and shuffle means are known per se and require no further description.

What is claimed is:

1. A method of recording a video signal comprising a sequence of video frames, said method comprising the steps:
   (a) supplying a sequence of video frames of normal resolution;
   (b) deriving, from each video frame, a browse set of reduced resolution;
   (c) writing a plurality of successive browse sets into a frame memory at different locations to generate a mosaic frame; and
   (d) storing successive mosaic frames in an intermediate memory,
wherein said step of supplying the sequence of video frames further comprises supplying a sequence of audio samples, and wherein said method further comprises the steps:
   deriving an audio browse sample from a plurality of successive audio samples in said sequence of audio samples; and
   recording successive audio browse samples in a further intermediate memory,
wherein each audio sample in said sequence of audio samples comprises B bits, B being equal to 16, a first B/2 bits of an audio sample being referred to as the most significant half (MSH), and a remaining B/2 bits of said audio sample being referred to as the least significant half (LSH), and wherein said step of deriving an audio browse sample comprises the steps:
   selecting $Aa_H \cdot Aa_V$ successive audio samples from said sequence of audio samples, where $Aa_H$ and $Aa_V$ are horizontal and vertical audio resolution factors, respectively;
   forming the MSH of the audio browse sample from the MSH of the first audio sample; and
   forming the LSH of the audio browse sample from the MSH of the $(1+(Aa_H \cdot Aa_V)/2)$th audio sample, wherein $Aa_H$ and $Aa_V$ are positive integers.

2. The method as claimed in claim 1, wherein, after said step of storing successive mosaic frames in the intermediate memory, said method further comprises the steps:
   reading out the mosaic frames from the intermediate memory; and
   recording the read-out mosaic frames on a carrier as a sequence in conformity with a video standard.

3. The method as claimed in claim 1, wherein said method further comprises the step:
   recording the supplied sequence of video frames on a carrier,
and wherein, after said step of storing the mosaic frames in the intermediate memory, said method further comprises the steps:
   reading out the mosaic frames from the intermediate memory; and
   recording the read-out mosaic frames on a further carrier as a sequence in conformity with a video standard.

4. The method as claimed in claim 3, wherein the further carrier on which the read-out mosaic frames are recorded is the same carrier on which the sequence of video frames is recorded.

5. The method as claimed in claim 4, wherein, in said step of recording the sequence of video frames on the carrier, an initial part of the carrier is left unrecorded, and, in said step of recording the read-out mosaic frames on the carrier, said read-out mosaic frames are recorded on the unrecorded initial part of the carrier.

6. The method as claimed in claim 3, wherein said method further comprises the steps:
   reading out the audio browse samples from the further intermediate memory; and
   recording the successive audio browse samples on the further carrier together with the mosaic frames.

7. The method as claimed in claim 1, wherein said step of deriving a browse set comprises:

filtering each video frame by a video factor $Va_H$ in a horizontal direction and by a video factor $Va_V$ in a vertical direction, $Va_H$ and $Va_V$ being integers, and wherein said step of step of writing the plurality of successive browse set s to generate a mosaic frame comprises:

writing $Va_H$ browse sets side by side into the frame memory, and writing $Va_V$ browse sets below one another into the frame memory.

8. The method as claimed in claim 7, wherein $Va_H$ and $Va_V$ are both equal to 4.

9. An editing computer comprising:

an input for receiving a sequence of mosaic frames and a sequence of audio browse samples;

a central processing unit;

an intermediate memory;

input means for entering edit commands;

an edit-command memory;

decoding means; and a frame memory, wherein the editing computer:

stores the received sequence of mosaic frames and the sequence of audio browse samples in the intermediate memory, each of said mosaic frames comprising a plurality of individual browse sets;

reads out a mosaic frame from the intermediate memory, decodes the read-out mosaic frame, stores the mosaic frames in the frame memory;

reads out an audio browse sample from the intermediate memory, and two audio samples from said audio browse sample, wherein a most significant half (MSH) of bits of a first of the two audio samples is formed from the MSH of bits of the read-out audio browse sample while a least significant half (LSH) of the bits of the first audio sample is made equal to zero, and the MSH of bits of a second of the two audio samples is formed from the LSH of the bits of the read-out audio browse sample while the LSH of the bits of the second audio sample is made equal to zero;

supplies the individual browse sets of the mosaic frame stored in the frame memory for display on the display screen; and supplies the audio samples at a rate suitable for sound reproduction.

10. The editing computer as claimed in claim 9, wherein the editing computer displays the browse sets and reproduces the audio samples in a sequence determined by information stored in the edit-command memory.

11. The editing computer as claimed in claim 9, wherein the editing computer further comprises:

a further input for receiving a sequence of full-resolution video frames and audio samples, corresponding to the mosaic frames and audio browse samples;

means for storing the sequence of full-resolution video frames and audio samples in the intermediate memory;

means for reading out the full-resolution video frames and audio samples from the intermediate memory; and an output for supplying the full-resolution video frames and audio samples from the intermediate memory in a sequence determined by the information stored in the edit-command memory.

12. The editing computer as claimed in claim 11, wherein the editing computer stores, in the intermediate memory, only the full-resolution video frames and audio samples which, on the basis of the information stored in the edit-command memory, are needed for editing.

13. A method of recording a video signal comprising a sequence of video frames, said method comprises the steps:

receiving a sequence of video frames of normal resolution and a sequence of audio samples;

recording the sequence of video frames and the sequence of audio samples on a carrier in which an initial portion of the carrier is left unrecorded;

deriving, from each video frame, a browse set of reduced resolution, said browse set being generated by filtering the video frame by a video factor $Va_H$ in a horizontal direction, and by a video factor $Va_V$ in a vertical direction, $Va_H$ and $Va_V$ being integers;

writing a plurality of successive browse sets into a frame memory at different locations to form a mosaic frame, said mosaic frame being formed by writing $Va_H$ browse sets side by side into the frame memory, and by writing $Va_V$ browse sets below one another into the frame memory;

deriving an audio browse sample from a plurality of successive audio samples in said sequence of audio samples, wherein each audio sample comprises B bits, B being an even integer, the first B/2 bits in each audio sample being referred to as the most significant half (MSH) of the bits of the audio sample, and the last B/2 bits in each audio sample being referred to as the least significant half (LSH) of the bits of the audio sample, and wherein each audio browse sample is formed by selecting $Aa_H \cdot Aa_V$ successive audio samples in said sequence of audio samples, forming the MSH of the bits of the audio browse sample from the MSH of the bits of a first of the successive audio samples, and forming the LSH of the bits of the audio browse sample from the MSH of the bits of the $(1+(Aa_H \cdot Aa_V)/2)$th audio sample of the successive audio samples, where $Aa_H$ and $Aa_V$ are horizontal and vertical audio resolution factors;

writing a plurality of successive audio browse samples in a further intermediate memory;

reading out said plurality of successive browse sets from said intermediate memory, and said plurality of successive audio browse samples from said further intermediate memory; and recording said read-out plurality of successive browse sets and said read-out plurality of successive audio browse samples in said unrecorded initial portion of said carrier.

* * * * *